United States Patent [19]
Reaves

[11] Patent Number: 5,909,430
[45] Date of Patent: Jun. 1, 1999

[54] ADDRESS ASSIGNMENT IN AN ATM SWITCHED NETWORK

[75] Inventor: James Edwin Reaves, Raleigh, N.C.

[73] Assignee: Northern Telecom Limited, Montreal, Canada

[21] Appl. No.: 08/775,565

[22] Filed: Dec. 31, 1996

[51] Int. Cl.⁶ .............................. H04L 12/56; G06F 13/00
[52] U.S. Cl. ......................... 370/254; 370/395; 370/400
[58] Field of Search .................................... 370/395, 396, 370/397, 254, 400, 252, 241, 453, 522, 410; 395/200.11

[56] References Cited

U.S. PATENT DOCUMENTS 5,617,540  4/1997  Civanlar et al. ................... 395/200.11
5,694,547  12/1997  Subramanian et al. ................. 370/254

OTHER PUBLICATIONS

"Classical IP and ARP Over ATM", M. Laubach, pp. 1–17, Hewlett–Packard Laboratories, Jan. 1993.

Primary Examiner—Chi H. Pham
Assistant Examiner—Maikhanh Tran
Attorney, Agent, or Firm—Finnegan, Henderson, Farabow, Garrett & Dunner, L.L.P.

[57] ABSTRACT

An ATM switched network has an ATM switch, an address server, and a plurality of nodes connected through virtual connections established by the ATM switch. When a node fails and is replaced, the ATM switch recognizes the installation of the node and notifies the address server. The address server selects an ATM address for the replacement node and sends the ATM address and an Internet Protocol (IP) address to the node. The node responds by requesting configuration data, which the address server downloads to the node. Thereafter, the node may initialize its communication interfaces within the ATM network. The address server also assigns ATM and IP addresses to network nodes following power-up of the network. Nodes are assigned an ATM address and an IP address by the address server, thereby eliminating the need to configure nodes with addressing information during manufacture or installation.

20 Claims, 6 Drawing Sheets

ADDRESS ASSIGNMENT IN AN ATM SWITCHED NETWORK

BACKGROUND OF THE INVENTION

The present invention relates generally to an address configuration technique for asynchronous transfer mode (ATM) switched networks, and specifically to a method of configuring nodes in an ATM switched network after power-up or a return from an inactive condition.

Asynchronous transfer mode (ATM) offers an advantageous transport structure for digital communications. ATM provides a high-bandwidth, multiplexing scheme for packet-based transmission of messages. In ATM, information to be communicated is packaged in fixed-size cells of relatively short length. Each cell contains a 5-octet label called a header that identifies the cell and the cell's connections. A 48-octet payload follows the header in the ATM cell and carries user information intended for a recipient. Switching networks rely on information stored in the header of ATM cells to switch and multiplex the cells along appropriate routes.

Endpoints in an ATM switched network are commonly referred to as nodes. Generally, a node may comprise a circuit board having electronics for transmitting, receiving, and processing information carried within the payload of the ATM cells. A switched ATM network will include a plurality of nodes, which typically are circuit boards or modules, connected together via an ATM switch. The ATM switch establishes virtual connections between itself and each of the nodes. The virtual connections are point-to-point between the ATM switch and the nodes, such that one node can communicate with another node in the ATM network only by way of the ATM switch.

For ATM cells to reach a desired destination, that destination must have a known ATM address. Conventionally, each node has a dedicated hardware address set by a non-volatile mechanism at the time of its manufacture or installation. For example, each circuit card in a rack of circuit cards that are nodes in an ATM switched network may contain non-volatile memory that stores a unique address for that node. If the node fails and must be replaced, maintenance personnel must then program the replacement node, or module, with the unique address for the node. Alternatively, the circuit card may have its unique address set by a physical switch or similar device. In this instance, maintenance personnel must physically configure a replacement node with the appropriate unique address prior to its installation.

When a node is replaced in the ATM switched network and powers-up, the replacement node conventionally broadcasts its hardware address on the ATM switched network. An address server linked to the ATM network has stored the hardware addresses of the nodes in the network, and will recognize the hardware address broadcast by the replacement node. Subsequently, the address server will assign a network address to the replacement node, and the replacement node will be able to communicate within the ATM switched network.

A problem may arise when a large number of nodes are first installed or become active in the network, such as after a power-up condition. In this instance, the installed or reactivated nodes will simultaneously broadcast their hardware addresses to the network address server and expect to receive their network addresses. Detrimental and unnecessary congestion on the ATM switched network may result.

Moreover, the unique hardware addresses for nodes in an ATM switched network increase the cost of manufacturing and maintaining the network. Customizing each node with a physical mechanism adds to the expense of manufacture and decreases the ease of interchangeability between circuit cards. Also, customizing each node by programming non-volatile memory adds to the time for replacing a failed node, which may be critical to the continued availability of the ATM switched network.

In light of the foregoing, a need exists for a technique to address a replacement node in an ATM switched network without requiring specialized manufacturing or installation activity to individually configure the node prior to its installation. A need also exists for a technique to avoid unnecessary congestion to an ATM network address server caused by the broadcasting of hardware addresses by a plurality of individual nodes upon power-up of the ATM network.

SUMMARY OF THE INVENTION

Accordingly, the present invention is directed to a method and apparatus for assigning addresses to nodes in an ATM switched network that substantially obviates one or more of the limitations and disadvantages of the described prior arrangements.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve these and other objects and advantages, and in accordance with the purpose of the invention as embodied and broadly described herein, a method consistent with the present invention configures at least one of a plurality of nodes in an ATM switched network, where the ATM switched network includes an ATM switch, an address server, and the plurality of nodes, and where the at least one node and the address server are connected with the ATM switch via virtual connections. The method comprises the steps of detecting at the address server a transition of the at least one node from an inactive condition to an active condition, selecting at the address server an ATM node address for the at least one node, transmitting the ATM node address from the address server to the at least one node via the ATM switch, and initializing the at least one node with the ATM node address received from the address server.

In another aspect, a method consistent with the present invention configures a link-interface unit in a signaling transfer point, where the link-interface unit is part of an ATM switched network, the ATM switched network includes an ATM switch and an address server, and the address server has a source address in the ATM switched network. The method of this aspect comprises the steps of transitioning the link-interface unit from an inactive to an active condition; detecting, at the ATM switch, the active condition and transmitting a link-active signal to the address server; receiving, at the address server, the link-active signal from the ATM switch and transmitting the source address and a link address back to the link-interface unit via the ATM switch; and initializing the link-interface unit with the link address and the source address.

In another aspect, a method consistent with the present invention boots an ATM switched network, where the ATM switched network includes an ATM switch, an address server, and a plurality of nodes. The address server includes a non-volatile storage device for storing operating system data for the address server, the ATM switch, and the plurality of nodes. The method comprises the steps of creating virtual connections between the ATM switch and the address server; reading address server operating system data from the non-volatile storage device, and configuring the address server in the ATM switched network; and reading ATM switch operating system data from the non-volatile storage device and configuring the ATM switch to build virtual connections to the plurality of nodes in the ATM switched network. The method further includes the steps of sending a respective ATM node address from the address server to each of the plurality of nodes; downloading node operating system data from the address server to each of the plurality of nodes; and initializing, at each of the plurality of nodes, communication interfaces with others of the plurality of nodes in the ATM switched network.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
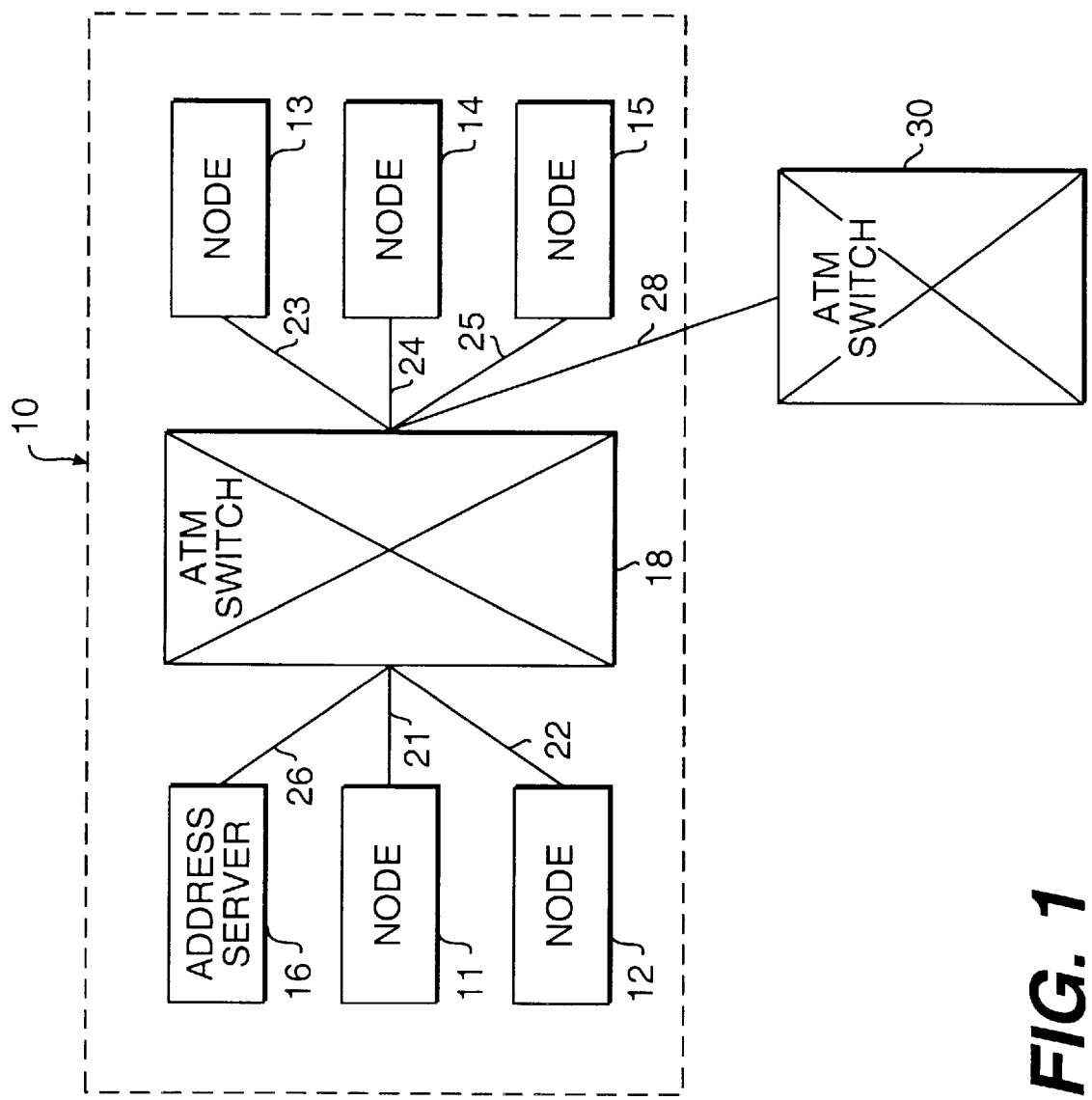
FIG. 1 is a block diagram of an ATM switched network in accordance with the present invention.

In accordance with the present invention, an ATM switched network comprises an ATM switch for multiplexing and switching ATM cells received on virtual connections and a plurality of nodes connected to the ATM switch via at least some of the virtual connections, where the plurality of nodes includes at least one node requiring an ATM node address and configuration data after transitioning from an inactive condition to an active condition. The ATM switched network further includes an address server connected via at least one of the virtual connections to the ATM switch, the address server providing the ATM node address to the at least one node after the at least one node transitions from the inactive condition to the active condition. FIG. 1 illustrates an arrangement for an ATM switched network that configures nodes within the network according to the present invention.

As herein embodied, and referred to generally at 10 in FIG. 1, the ATM switched network comprises nodes 11–15, address server 16, and ATM switch 18. The quantity and arrangement of nodes 11–15 in FIG. 1 is exemplary only. A larger or smaller quantity of nodes may exist within ATM switched network 10 without impacting the present invention. ATM switch 18 generally comprises a multiplexing signal switch capable of routing ATM cells and is a standard unit well known and available in the art. ATM switch 18 serves to route ATM cells between at least address server 16 and nodes 11–15. To do so, ATM switch 18 establishes virtual connections (VC) between ATM switch 18, individual nodes 11–15, and address server 16. As is readily known in the art, virtual connections formed by ATM switch 18 establish point-to-point connections between switch 18 and the endpoint to the respective virtual connection. Physical connections 21–26 depict figuratively the paths for virtual connections between the network elements. For purposes of discussion, physical connections 21–26 and the virtual connections between the network elements will be discussed interchangeably.

As herein embodied and generally shown in FIG. 1, nodes 11–15 comprise endpoints for the reception and transmission of ATM messages within the ATM switched network 10. Preferably, although not exclusively, nodes 11–15 are circuit boards or electronic modules that contain at least a microprocessor or microcontroller, together with affiliated memory for storing and executing firmware or software instructions. Nodes 11–15 communicate through ATM switched network 10 individually by way of virtual connections 21–25, respectively. For example, in ATM switched network 10, node 12 may transmit an ATM cell to node 14 using virtual connection 22, ATM switch 18, and virtual connection 24. Conversely, node 14 may transmit ATM cells to node 12 using the same virtual connections 24 and 22 and ATM switch 18 in the reverse order.

Nodes 11–15 may also contain communication links with elements of other networks besides ATM switched network 10 shown in FIG. 1. For instance, ATM switch 18 may establish a virtual connection 28 with ATM switch 30, which may have separate virtual connections with nodes or other ATM switches or elements beyond those of ATM switched network 10. It will be appreciated that the connection of ATM switches 18 and 30 with other networks may become expansive, well beyond that depicted in FIG. 1.

Figure 2:
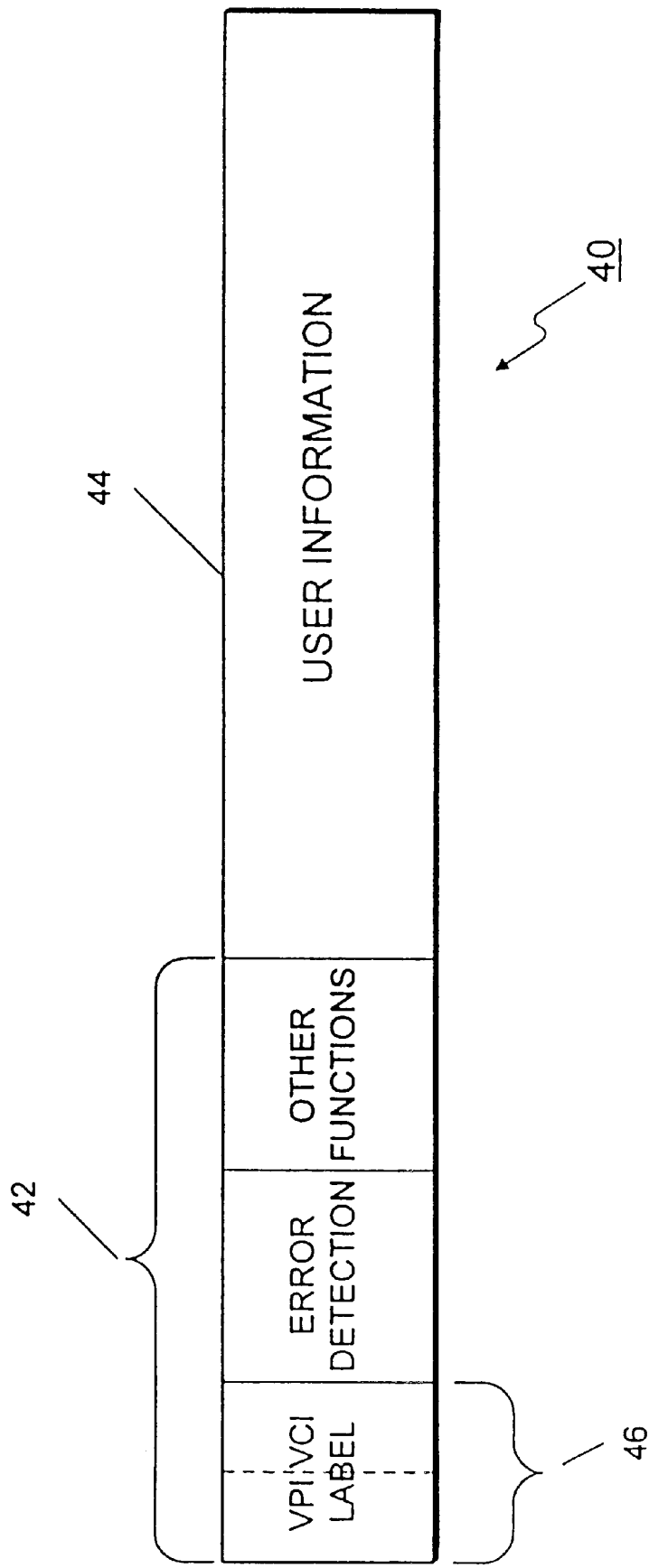
FIG. 2 is a diagram of the general format of an ATM cell for use in the ATM switched network of FIG. 1.

As is readily known in the art, ATM cells have a unique message structure. As shown in FIG. 2, information to be communicated by ATM is packaged in fixed-size cells of relatively short length. Each cell, shown generally in format as 40, has a header 42 and a payload 44. Header 42 is a 5-octet label that identifies the cell and its source and destination. A 48-octet payload 44 follows the header 42 in the ATM cell 40 and carries user information intended for a recipient. Switching networks, such as ATM switched network 10, rely on information stored in the header of ATM cells to switch and multiplex the cells along appropriate routes. Within ATM header 42 is a virtual path indicator (VPI) and a virtual connection identifier (VCI) label, referenced collectively as 46, together with other administrative information. The VPI-VCI 46 is locally significant to the user interface between each of the nodes 11–15 in FIG. 1, for example, and ATM switch 18. Specifically, the VPI-VCI 46 will indicate the destination for user information within payload 44 and other information.

Referring to FIG. 1, ATM switch 18 receives, multiplexes, and switches messages having the ATM cell structure 40. ATM switch 18 receives ATM cells from nodes 11–15, address server 16, or ATM switch 30, for example, and routes the cells according to information stored in the VPI-VCI fields of the respective ATM cell.

Address server 16 of the present invention as embodied in FIG. 1 generally comprises a boot-up module for ATM switched network 10. The address server 16 preferably is embodied as a circuit board, or module, having a microprocessor or microcontroller with affiliated memory. In addition, address server 16 includes a non-volatile memory device, such as a hard-disk drive or a tape drive. To communicate with individual nodes, such as nodes 11–15 in the ATM switched network 10, address server 16 sends and receives ATM cells to and from ATM switch 18 via connection 26. As previously described, ATM switch 18 routes ATM cells from address server 16 accordingly.

In accordance with the present invention, a method for configuring at least one of a plurality nodes in an ATM switched network comprises the steps of detecting at an address server a transition of the at least one node from an inactive to an active condition, selecting at the address server an ATM node address for the at least one node, transmitting the ATM node address from the address server to the at least one node via the ATM switch, and initializing the at least one node with the ATM node address received from the address server.

As herein embodied and illustrated in FIG. 1, the ATM switched network 10 uses address server 16, particularly its microprocessor or microcontroller, to configure the network elements, such as nodes 11–15, when the network elements transition from an inactive condition to an active condition. The hard-disk drive within address controller 16 stores system configuration information that the address controller 16 selectively distributes to network elements as appropriate. For example, if the module of node 12 fails, that module must be replaced with a module that operates properly. Prior to the present invention, the replacement module would need a hardware address, either using a physical mechanism or programming non-volatile memory on the module upon its installation. In accordance with the present invention, a module for a node does not require a hardware address. Instead, address server 16 detects the installation of replacement node 12 from ATM switch 18, and assigns appropriate ATM and Internet Protocol (IP) addresses to the replacement node 12. The replacement node 12 may then request further configuration data from address server 16, such as operating system software, which will download the information from its hard disk or other non-volatile storage device.

Figure 3:
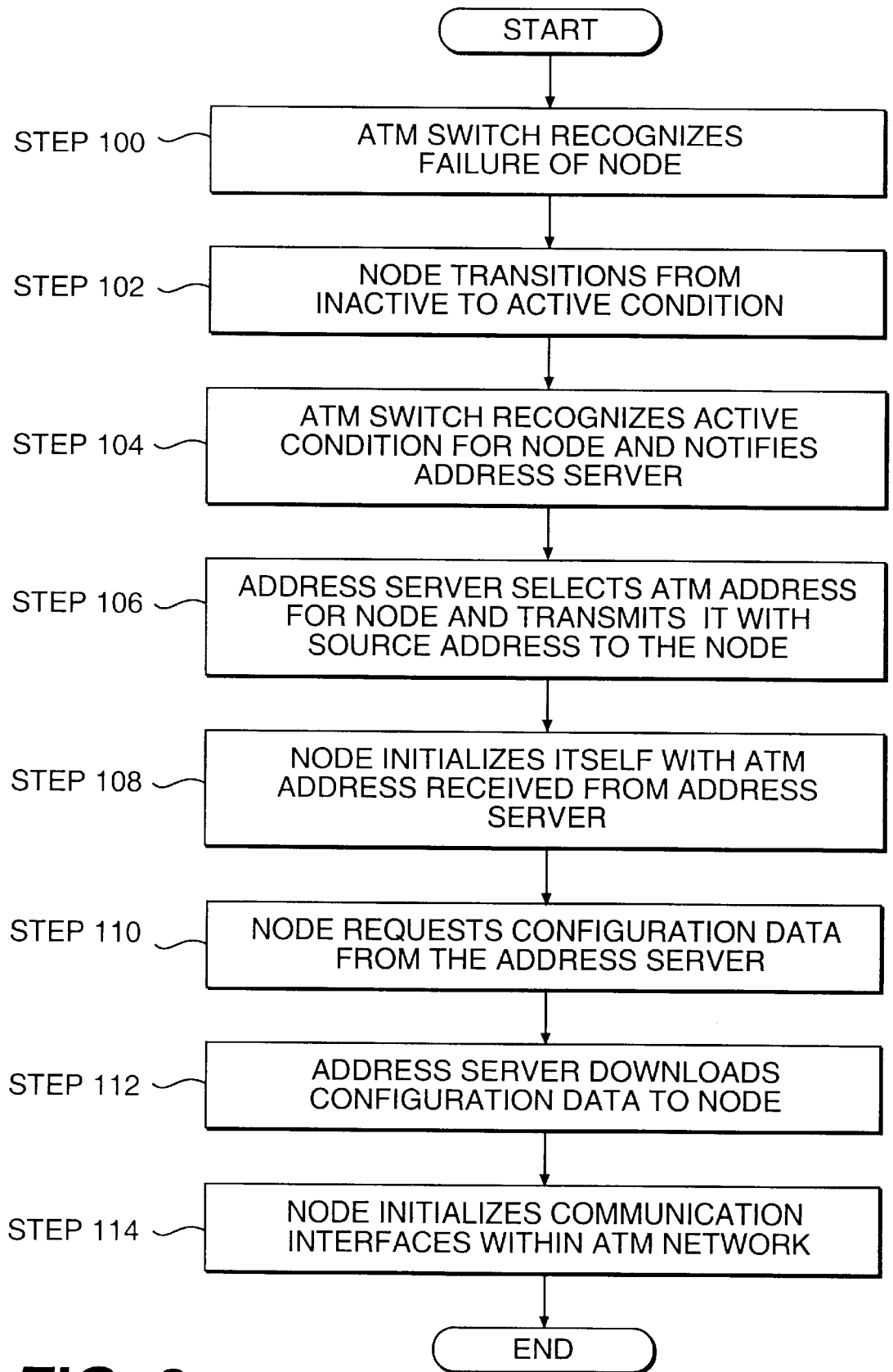
FIG. 3 is a flowchart of a first method for performing the present invention in the ATM switched network of FIG. 1.

The invention will be clarified by reference to the following example, which is intended to be purely exemplary of the invention. FIG. 3 depicts a flowchart of a method as herein embodied for configuring at least one node of a plurality of nodes in an ATM switched network. Step 100 in FIG. 3 indicates that one of the plurality of nodes in ATM switched network 10 fails and that ATM switch 18 recognizes the failure. A node within the ATM switched network 10 may fail periodically for a variety of reasons. For example, an electronic problem may render inactive a circuit card of the node or a software problem may cause a processor within a circuit card of the node to seize or hang. These situations may force maintenance personnel to replace the module. In contrast to conventional systems, replacement nodes of the present invention do not need to have a prearranged hardware address. After a replacement node is installed and the electronics of that node transition from an inactive condition to an active condition as shown in step 102, which typically occurs when the node obtains sufficient power, the node will begin sending signals that indicate its active state. For example, the node may begin sending idle patterns, ATM idle cells, symbols, or basic line transitions.

As depicted in step 104 of the flowchart of FIG. 3, ATM switch 18 will recognize the presence of the replacement node. Assume for purposes of example that node 12 has failed and been replaced. The control logic of ATM switch 18 will detect the active condition of replacement node 12 due to the receipt, for example, of idle patterns from connection 22 of replacement node 12 with ATM switch 18. After recognizing the existence of the replacement node, ATM switch 18 notifies address server 16 that the node 12 is available, as shown in step 104. Address server 16 thereby detects a need to assign an address to the newly added node 12. In the interim, node 12, unknowing of its proper ATM and IP addresses, simply waits. ATM switch 18, and therefore address server 16, can determine the physical location of node 12 by previously storing in memory the virtual connection that had previously failed. ATM switch 18 can identify the physical location of node 12 when node 12 reestablishes its connection to virtual connection 22. Knowing the physical location of node 12, address server 16 selects an appropriate ATM node address for node 12. In addition, but not by way of limitation, address server 16 may also select an IP address for node 12. As shown as step 106 in FIG. 3, address server 16 transmits the appropriate ATM node address, and possibly also IP node address, to node 12. Transmission of the node address occurs through ATM switch 18 via virtual connections 26 and 22. In addition, address server 16 preferably transmits its own ATM address and IP address, i.e., the source addresses, to node 12.

Figure 4:
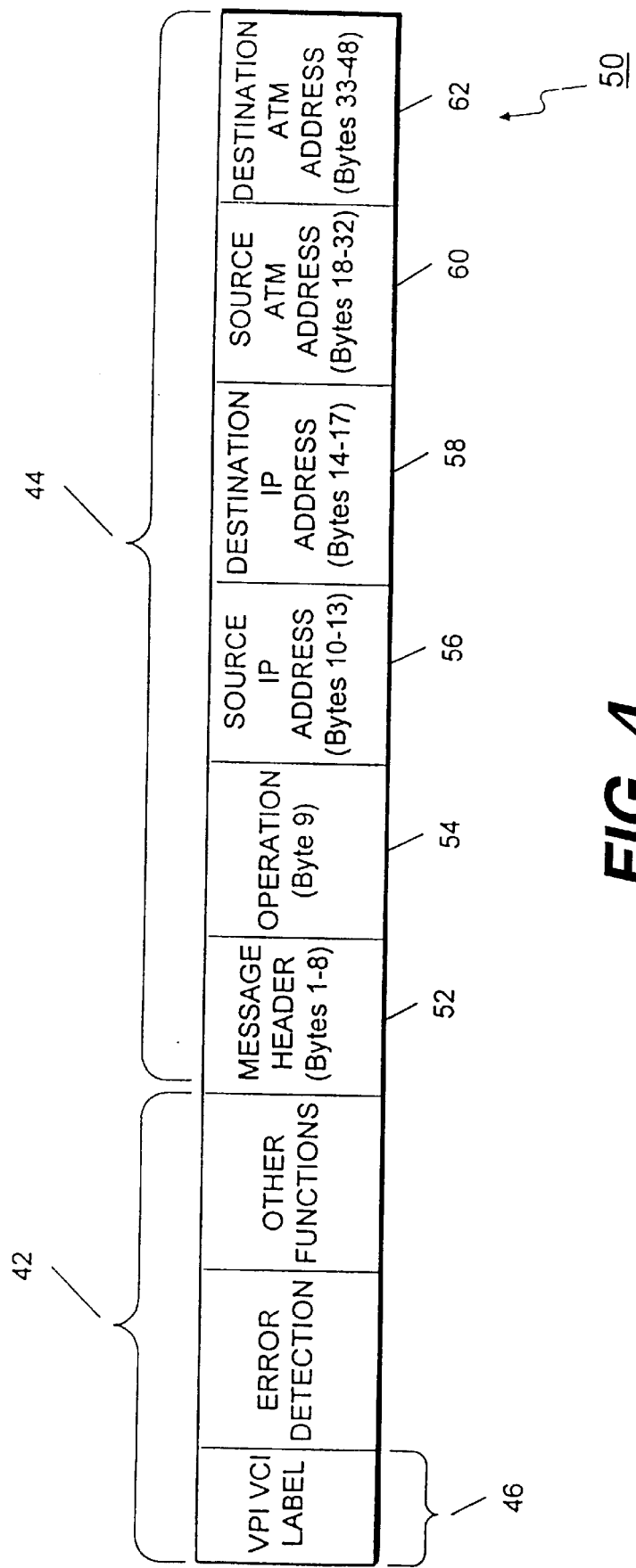
FIG. 4 is a diagram of the preferred format of an ATM cell for use in addressing a node in the ATM switched network of FIG. 1.

FIG. 4 illustrates a preferred ATM message format for sending address assignments to nodes using the present invention. The replacement module of node 12, until this point, has not had a specific address for use within ATM switched network 22. The replacement module of node 12, while powered and active, waits to receive its addressing information from address server 16. Specifically, by way of example, node 12 awaits an ATM cell having a format as shown in FIG. 4 as reference 50. ATM cell 50 has standard ATM format with header 42 and payload 44. VPI-VCI 46 indicates the channel and path destinations for the cell. Within its payload 44, ATM cell 50, however, includes the addressing information for node 12. For instance, bytes 1–8 of payload 44 comprise a message header 52. A code within bytes 1–8 of the payload that is predetermined for ATM switched network 10 indicates to the replacement node 12, or any other replacement node, that the remaining information in payload 44 of ATM cell 50 contains addressing information. Byte 9 in payload 44 may contain an operation instruction 54, which indicates whether the information in ATM cell 50 is in response to a request from the replacement node (described below) or is a command from the address server for the node to configure itself with the contained address information. Bytes 10–13 and 14–17 in payload 44 of ATM cell 50 may indicate the IP addresses for the source 56 (i.e. the address server 16) and for the destination (i.e. node 12), respectively. Similarly, bytes 18–32 and 33–48 in payload 44 may indicate the ATM addresses for the source 60 and for the destination 62, respectively.

Referring again to FIG. 3, step 108 indicates that node 12, as an example, initializes itself with the ATM address and the IP address received from the address server 16. The node 12 also stores the source ATM and IP addresses 56 and 60 and sends a response message to request further configuration information and operating system software from address server 16 (step 110). Node 12 may now send an ATM message to address server 16 because ATM cell 50 included the ATM and IP addresses 56 and 60. After receiving the request from node 12 for further configuration information, address server 16 downloads operating system software and other configuration data for node 12 to return to a fully active state (step 112). After receiving the download of configuration information from address server 16, node 12 will then initialize its communication interfaces (step 114), building connections to all other nodes in ATM switched network 10 in a full mesh scheme.

The previously described method for configuring at least one of a plurality of nodes in an ATM switched network provides several advantages. For example, by allocating and assigning a node address using an address server within the ATM switched network, manufacturing costs for individual nodes is decreased. Nodes 11–15 in FIG. 1, for instance, do not need to have a permanently configured address set using non-volatile memory or physical switches on the node circuit card. Instead, each node circuit card may be generically designed and manufactured without having a specific address. Likewise, maintenance costs and time may be reduced. When a certain node in an ATM switched network fails, maintenance personnel can replace the failed node, or any other node, with a generic node circuit card. According to the present invention, the ATM switched network will configure the replaced node with an appropriate ATM and IP node address, so maintenance personnel do not need to designate a hardware address for the replacement node.

Moreover, because address server 16 controls the timing for address assignment and configuration data download, the address server 16 can manage congestion within ATM switch 18. For example, if numerous nodes are replaced at about the same time, address server 16 may receive several simultaneous requests for a download of operating system software to separate nodes. The transfer of this amount of data, often on the order of 3 megabytes, may cause unwanted congestion through ATM switch 18. Address server 16 can avoid this congestion by managing the times when data is downloaded through ATM switch 18.

Also according to the present invention, a method for booting an ATM switched network comprises the steps of creating virtual connections between an ATM switch and an address server, reading address server operating system data from a non-volatile storage device, configuring the address server, reading ATM switch operating system data from the non-volatile storage device, and configuring the ATM switch. The method further comprises the steps of sending a respective ATM node address from the address server to each of the nodes, downloading node operating system data from the address server to each of the nodes, and initializing communication interfaces with other nodes in the network.

Figure 5:
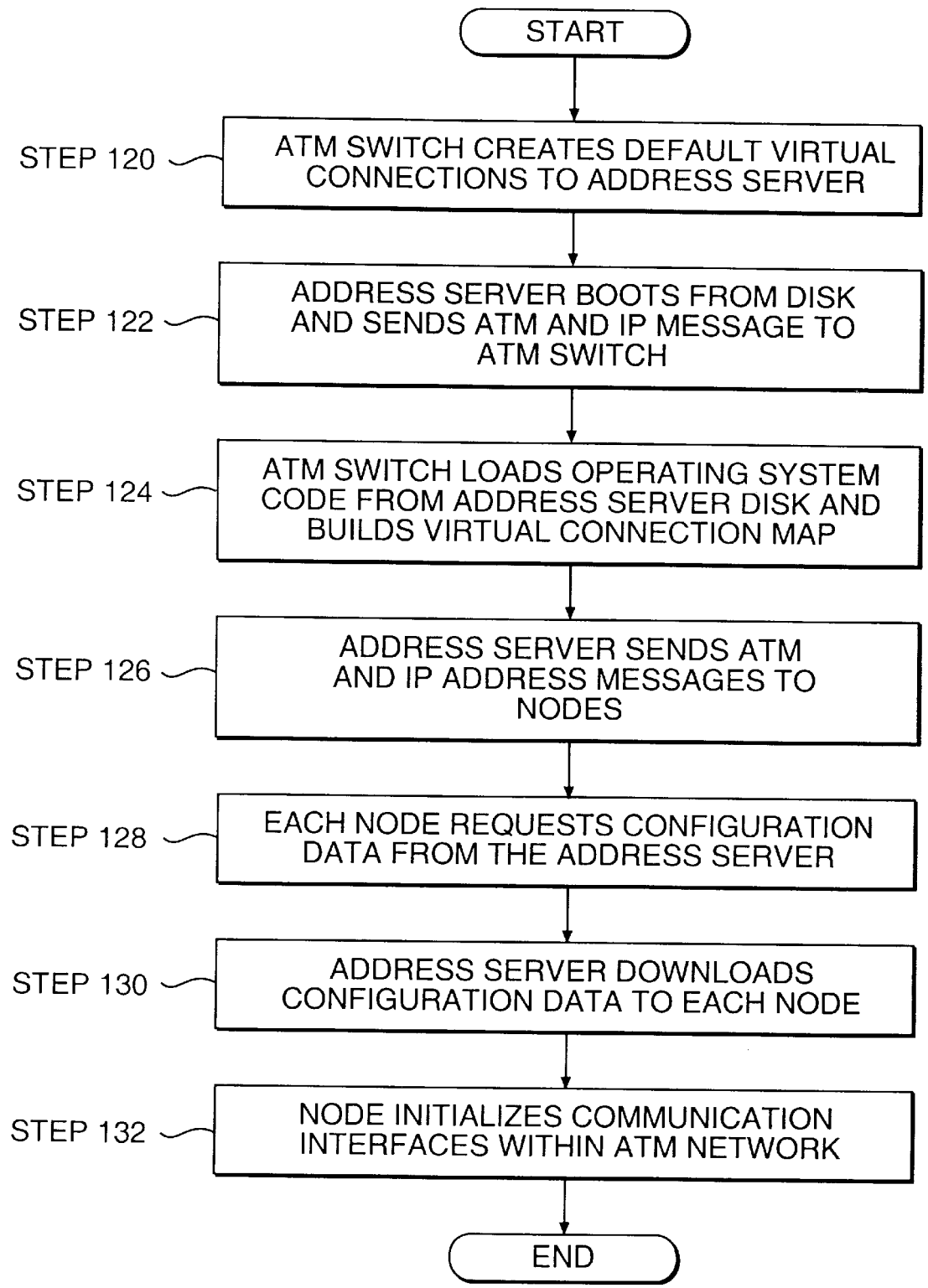
FIG. 5 is a flowchart of a second method for performing the present invention in the ATM switched network of FIG. 1.

FIG. 5 depicts a flowchart of a method as herein embodied for booting an ATM switched network. As shown in step 120, when ATM switched network 10 first powers-up, ATM switch 18 creates default virtual connections to all other elements in the network 10, including address server 16. These virtual connections, such as virtual connection 26, permit address server 16 to locate and then communicate with ATM switch 18. A significant feature of the present invention is that address server 16 may be located anywhere within network 10. By creating virtual connections to all nodes, ATM switch 18 can find address server 16, whatever its location is.

Address server 16 boots from a hard disk, typically resident within it, and sends relevant ATM and IP messages to ATM switch 18. ATM switch 18 then obtains its operating system software from the hard disk of address server 16 and builds a virtual connection map to its nodes (step 124). Address server 16, of course, may include other types of non-volatile storage such as a tape drive or optical disk. Thereafter, address server 16 sends appropriate ATM and IP address messages in the format of ATM cell 50 to the nodes via ATM switch 18 (step 126).

After receiving its respective ATM and IP node address, each node will then request further configuration data from address server 16, as shown in step 128. Address server 16 will respond to these requests by downloading the operating system software and other configuration data to each of the nodes (step 130). However, due to the potential for unwanted congestion within ATM switch 18, address server 16 will preferably arbitrate the downloading of data to selected nodes at selected times. Finally, after receiving the necessary configuration data, each node will initialize its communication interfaces within the ATM network based on its assigned ATM and IP addresses. When connections have been built between all other nodes in a full mesh scheme, all nodes will be able to communicate.

Figure 6:
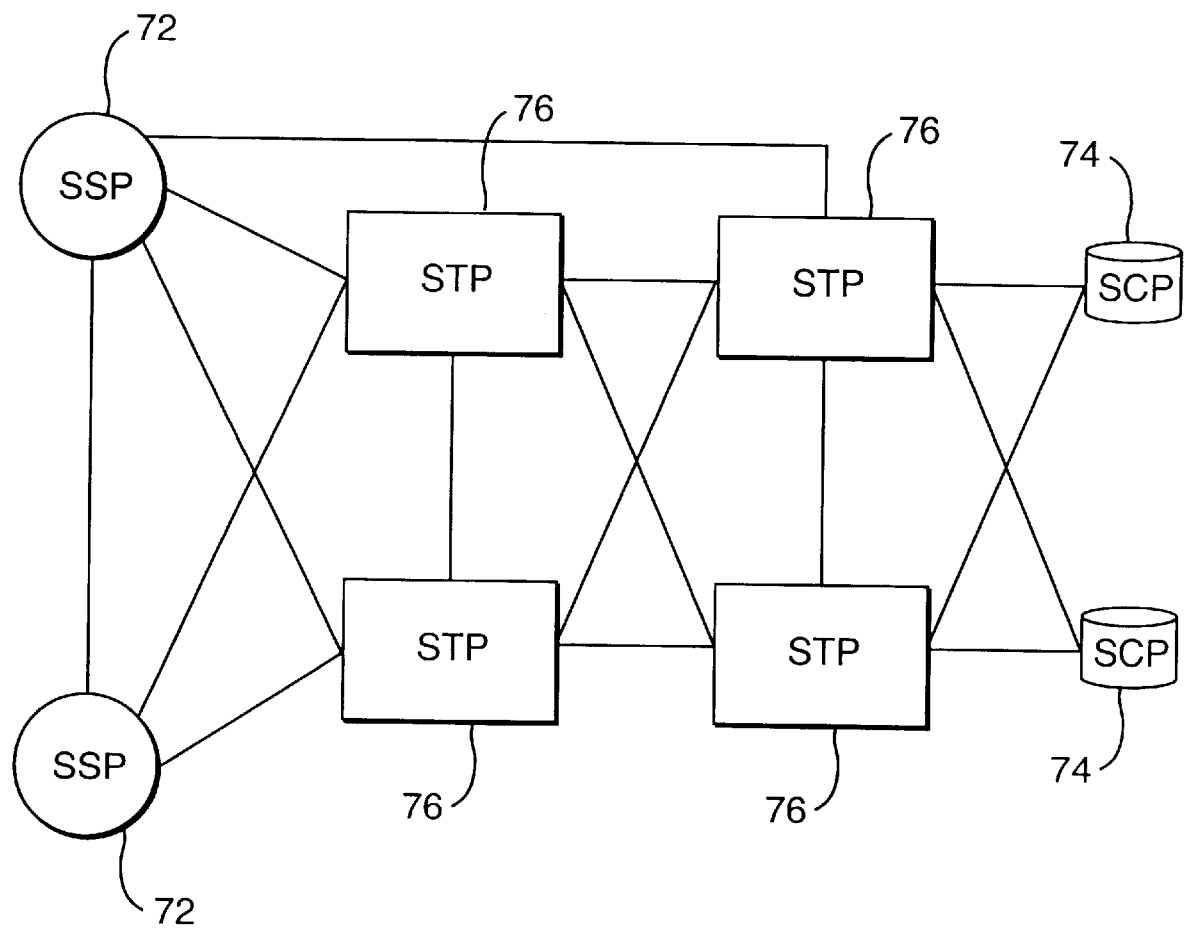
FIG. 6 is a block diagram of a Common Channel Signaling Network for using the methods of the present invention of FIGS. 4 and 5.

Although the present invention may be applied to any ATM switched network, an application of particular note is an ATM switched network within a signaling transfer point (STP) of a telecommunications signaling network. As shown in FIG. 6, a signaling network for common channel signaling (CCS) according to Signaling System No. 7 (CCS7) comprises a group of signaling points. A typical CCS7 network 70 shown in FIG. 6 has three key signaling points: a Service Switching Point (SSP) 72; a Service Control Point (SCP) 74; and a Signaling Transfer Point (STP) 76. SSPs 72 are located at a central office to provide CCS7 trunk signaling and/or the capability to query a database to determine call routing. The SCPs 74 house databases with call routing information that SSPs and other network elements use to provide advanced services in a telecommunications network. The STPs 76 route CCS7 messages between the signaling points and control access to the CCS7 network.

STPs 76 provide a key function in processing the signaling used in telecommunications. Unlike other nodes in a CCS7 network 70, an STP does not generally act as a source or ultimate destination of CCS7 application messages. The STP functions as both a static and dynamic routing database that controls access to, and directs call signaling between, a variety of CCS7 nodes and networks. The STP monitors, maintains, and reports different levels of information concerning the availability and unavailability of CCS7 nodes, routes, and services.

ATM provides an advantageous format for processing signaling information within an STP. An STP, among other things, comprises a plurality of link-interface cards that receive signaling information from links to other network elements. Within the STP 76, data from a particular link must be multiplexed or switched from one link-interface card to another for transmission to a destination. Consequently, the use an ATM switched network within STP 76 arises naturally with the use of link-interface cards as nodes within the ATM switched network 10. Data arriving at STP 76 can be adapted to ATM format for routing within STP 76. The STP 76 will include an ATM switch 18 for switching and multiplexing the ATM cells. As well, STP 76 will include an address server 16 as a boot-up module. Address server 16 within STP 76 can detect the transition of a link-interface card, such as nodes 11–15, from an inactive condition to an active condition. This detection may occur when a replacement link-interface card begins sending ATM cells to ATM switch 18. In response, ATM switch 18 may transmit a link-active signal to address server 16, indicating that the node is available and active. The address server 16 will then transmit its ATM and IP source address and a selected ATM and IP destination address for the replacement node. As described in FIGS. 3 and 5, the replacement node will then initialize itself and request further configuration data from address server 16. After obtaining its operating system software, the link-interface unit in STP 76 will establish its connections with other link-interface units within the ATM switched network. Thus, the ATM switched network of the present invention may permit the less expensive and more rapid installation of replacement link-interface cards as disclosed herein.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for configuring a node in an ATM switched network including an ATM switch and an address server, the node and the address server being connected with the ATM switch, the method comprising the steps of:

detecting at the address server a transition of the node from an inactive condition to an active condition;

selecting at the address server an ATM node address for the node in response to the detected transition;

transmitting the selected ATM node address from the address server to the one node via the ATM switch; and initializing the node with the selected ATM node address.

2. The method of claim 1, further comprising the step of:

downloading from the address server to the node configuration data to initialize communication interfaces between the one node and the other nodes in the ATM switched network.

3. The method of claim 2, further comprising the step of sending a request for configuration data received from the node to the address server.

4. The method of claim 1, wherein the detecting step includes the substep of detecting the transition of the node based on line transitions on a virtual connection between the ATM switch and the node.

5. The method of claim 1, wherein the selecting step includes the substep of selecting the ATM node address for the node based on a physical location of the node in the ATM switched network.

6. The method of claim 1, wherein the transmitting step includes the substep of transmitting a source address for the address server together with the ATM node address for the node.

7. The method of claim 6, wherein the transmitting step includes the substep of transmitting a source ATM address and a source Internet Protocol address as the source address, and transmitting a destination ATM address and a destination Internet Protocol address as the ATM node address.

8. The method of claim 1, further comprising the step of:

coordinating the steps of selecting and transmitting for the node with steps of selecting and transmitting for other nodes based on traffic within the ATM switch.

9. A method of configuring a link-interface unit in a signaling transfer point, the link-interface unit being part of an ATM switched network, including an ATM switch and an address server, having a source address in the ATM switched network, the method comprising the steps of:

transitioning the link-interface unit from an inactive to an active condition;

detecting, at the ATM switch, the active condition and transmitting a link-active signal to the address server in response to the detected active condition;

receiving, at the address server, the link-active signal from the ATM switch;

transmitting, in response to the receipt of the link-active signal, the source address and a link address back to the link-interface unit via the ATM switch, the link address designating an address for the link-interface unit within the ATM switched network; and initializing the link-interface unit with the link address and the source address.

10. The method of claim 9, further comprising the steps of:

requesting, from the link-interface unit to the address server of the source address, configuration data for the link-interface unit to initialize communication interfaces between the link-interface unit and other link-interface units in the ATM switched network; and downloading the configuration data from the address server to the link-interface unit.

11. The method of claim 9, wherein the step of transmitting the source address and the link address includes the substep of transmitting an ATM node address as the link address for the link-interface unit based on a physical location of the link-interface unit in the ATM switched network.

12. The method of claim 9, wherein the step of transmitting a source address and a link address includes the substep of transmitting a source ATM address and a source Internet Protocol address as the source address, and transmitting a destination ATM address and a destination Internet Protocol address as the link address.

13. An ATM switched network, comprising:

a plurality of nodes;

an ATM switch, coupled to the nodes, for multiplexing and switching ATM cells received on virtual connections, the ATM switch including means for determining when a first one of the nodes changes from an inactive to an active condition; and an address server connected to the ATM switch and including means for determining from the ATM switch that the first node has transitioned and means for providing to the first node the ATM node address and configuration data to initialize communication interfaces between the first node and others of the plurality of nodes in the ATM switched network.

14. The ATM switched network of claim 13, wherein the address server includes means for providing to the node a source ATM address and a source Internet Protocol address as a source address of the address server, and transmitting a destination ATM address and a destination Internet Protocol address as the ATM node address.

15. The ATM switched network of claim 13, wherein the address server includes means for downloading configuration data to the one node after providing the one node with the ATM node address.

16. The ATM switched network of claim 13, wherein the one node is a link-interface unit in a signaling transfer point.

17. A method for booting an ATM switched network, including an ATM switch, a plurality of nodes, and one address server including a non-volatile storage device for storing operating system data for the address server, the ATM switch, and the plurality of nodes, the method comprising the steps of:

reading, by the address server, address server operating system data from the non-volatile storage device and configuring the address server in the ATM switched network;

reading, by the ATM switch, ATM switch operating system data from the non-volatile storage device and configuring the ATM switch to build virtual connections to the nodes in the ATM switched network;

sending a respective ATM node address from the address server to each of the nodes;

downloading node operating system data from the address server to each of the nodes; and initializing, at each of the nodes, communication interfaces with others of the nodes in the ATM switched network.

18. The method of claim 17, further comprising the step of receiving, at the address server, a request for the operating system data from the nodes, and wherein the downloading step occurs in response to the receipt of requests.

19. The method of claim 18, wherein the downloading step includes the substep of selectively downloading operating system data based on traffic within the ATM switch.

20. The method of claim 17, wherein the sending step includes the substep of sending a source ATM address and a source Internet Protocol address as a source address for the address server, and sending a destination ATM address and a destination Internet Protocol address as the respective ATM node address.

* * * * *